(12) United States Patent
Cho et al.

(10) Patent No.: US 11,862,810 B2
(45) Date of Patent: Jan. 2, 2024

(54) SEPARATOR FOR ELECTROCHEMICAL ELEMENT

(71) Applicant: JAPAN VILENE COMPANY, LTD., Tokyo (JP)

(72) Inventors: Hiroki Cho, Ibaraki (JP); Yoshinori Sato, Ibaraki (JP); Ayuka Noguchi, Ibaraki (JP); Akihiko Kawano, Ibaraki (JP); Masanao Tanaka, Ibaraki (JP); Yasuhiro Ito, Tokyo (JP)

(73) Assignee: JAPAN VILENE COMPANY, LTD., Tokyo (JP)

( * ) Notice: Subject to any disclaimer, the term of this patent is extended or adjusted under 35 U.S.C. 154(b) by 0 days.

(21) Appl. No.: 17/716,776

(22) Filed: Apr. 8, 2022

(65) Prior Publication Data

US 2022/0231377 A1 Jul. 21, 2022

Related U.S. Application Data

(63) Continuation of application No. 16/631,408, filed as application No. PCT/JP2018/026772 on Jul. 17, 2018, now abandoned.

(30) Foreign Application Priority Data

Jul. 18, 2017 (JP) .................. 2017-139501

(51) Int. Cl.
   *H01M 50/44* (2021.01)
   *H01M 50/429* (2021.01)
   (Continued)

(52) U.S. Cl.
   CPC ......... *H01M 50/44* (2021.01); *H01M 50/423* (2021.01); *H01M 50/4295* (2021.01);
   (Continued)

(58) Field of Classification Search
   CPC ..................... H01M 50/44; H01M 50/441
   See application file for complete search history.

(56) References Cited

U.S. PATENT DOCUMENTS

| 6,447,958 B1 | 9/2002 | Shinohara et al. |
| 2008/0182167 A1 | 7/2008 | Kritzer |
| (Continued) | | |

FOREIGN PATENT DOCUMENTS

| CA | 2961540 A1 | 3/2016 |
| CN | 1708865 A | 12/2005 |
| (Continued) | | |

OTHER PUBLICATIONS

International Search Report; International Application No. PCT/JP2018/026772; International Filing Date—Jul. 17, 1 2018; dated Oct. 9, 2018.

*Primary Examiner* — Stephan J Essex
(74) *Attorney, Agent, or Firm* — CANTOR COLBURN LLP

(57) ABSTRACT

Disclosed herein is a separator for an electrochemical element, comprising a fibrous structure, wherein the fibrous structure has a first fibrous layer part in which short fibers and/or pulp-like fibers are intertwined with each other, and a second fibrous layer part; some of the short fibers and/or the pulp-like fibers constituting the first fibrous layer part penetrates the second fibrous layer part; and a pore diameter distribution of the fibrous structure satisfies the following formula: $0\ \mu m < Dmax < 18\ \mu m$, and $0\ \mu m \leq (Dmax-Dave) < 13\ \mu m$, wherein Dmax is a maximum pore diameter ($\mu m$) of the fibrous structure, and Dave is an average pore diameter ($\mu m$) of the fibrous structure.

5 Claims, 4 Drawing Sheets

(51) Int. Cl.
*H01M 50/449* (2021.01)
*H01M 50/491* (2021.01)
*H01M 50/423* (2021.01)
*H01M 50/414* (2021.01)
*H01M 50/454* (2021.01)
*H01M 50/451* (2021.01)

(52) U.S. Cl.
CPC ....... *H01M 50/449* (2021.01); *H01M 50/491* (2021.01); *H01M 50/414* (2021.01); *H01M 50/451* (2021.01); *H01M 50/454* (2021.01)

(56) References Cited

U.S. PATENT DOCUMENTS

| | | | |
|---|---|---|---|
| 2010/0092853 A1 | 4/2010 | Ito et al. | |
| 2015/0093625 A1* | 4/2015 | Hirano | H01M 50/44 429/144 |
| 2015/0118540 A1 | 4/2015 | Fujiwara et al. | |
| 2015/0171397 A1 | 6/2015 | Yamada et al. | |
| 2015/0221916 A1 | 8/2015 | Lee et al. | |
| 2016/0204406 A1 | 7/2016 | Ryu et al. | |
| 2017/0283565 A1 | 10/2017 | Ono et al. | |

FOREIGN PATENT DOCUMENTS

| | | | | |
|---|---|---|---|---|
| CN | 101068043 A | | 11/2007 | |
| CN | 101523639 A | * | 9/2009 | ............ H01M 2/162 |
| CN | 101523639 A | | 9/2009 | |
| CN | 102356441 A | | 2/2012 | |
| CN | 102549805 A | | 7/2012 | |
| CN | 104518189 A | | 4/2015 | |
| CN | 107075804 A | | 8/2017 | |
| EP | 3199701 A1 | | 8/2017 | |
| EP | 2077593 B1 | | 4/2019 | |
| JP | H10292289 A | | 11/1998 | |
| JP | 2007048533 A | | 2/2007 | |
| JP | 2010219335 A | | 9/2010 | |
| KR | 1020170044190 A | | 4/2017 | |
| TW | 201621116 A | | 6/2016 | |
| WO | 2008047542 A1 | | 4/2008 | |
| WO | 2011027870 A1 | | 3/2011 | |
| WO | 2016047764 A1 | | 3/2016 | |

* cited by examiner

SEPARATOR FOR ELECTROCHEMICAL ELEMENT

CROSS REFERENCE TO RELATED APPLICATIONS

This application is a Continuation of application Ser. No. 16/631,408, filed Jul. 17, 2018, which is a National Stage application of PCT/JP2018/026772, filed Jul. 17, 2018, which claims priority to Japanese Application No. 2017-139501, filed Jul. 18, 2017, and all the benefits accruing therefrom under 35 U.S.C. § 119, the content of which is incorporated by reference in its entirety.

TECHNICAL FIELD

The present invention relates to a separator for an electrochemical element.

BACKGROUND ART

Electrochemical elements have been required to have properties of low electric resistance between electrodes so as to have excellent electric output properties such as excellent high rate electric discharge, and have been required to have properties of hardly occurring of an electric short circuit.

As a separator for an electrochemical element capable of providing an electrochemical element satisfying these requirements, for example, Patent Literature 1 discloses a separator for a lithium ion secondary battery, consisting of a nonwoven fabric prepared by forming a microfine fibrous layer mainly composed of ultrafine short fibers and/or pulp-like fibers on a fiber reinforcing layer.

Patent Literature 1 discloses that an electrochemical element having low electric resistance between electrodes can be provided by a thin separator for an electrochemical element consisting of a nonwoven fabric having a thickness of 50 μm or less, and that an electrochemical element excellent in electric short circuit prevention can be provided by a separator for an electrochemical element consisting of a nonwoven fabric having an average pore diameter of 15 μm or less.

CITATION LIST

Patent Literature

Patent Literature 1: JP 2007-048533

SUMMARY OF THE INVENTION

Technical Problem

In order to provide a separator for an electrochemical element capable of providing an electrochemical element having low electric resistance between electrodes and hardly occurring of an electric short circuit, the present inventors have studied the separator for an electrochemical element described in Patent Literature 1.

As a result of the study, it was found that the nonwoven fabric constituting the separator for an electrochemical element described in Patent Literature 1 has a large maximum pore diameter and a wide pore diameter distribution. Therefore, even when using the separator for an electrochemical element according to the conventional technology of Patent Literature 1, it is considered that there is a limit to providing an electrochemical element having lower electric resistance between electrodes and more hardly occurring of an electric short circuit.

In other words, it is considered that a separator for an electrochemical element consisting of a nonwoven fabric having a large maximum pore diameter, is likely to have an electric short circuit due to a direct contact between a positive electrode and a negative electrode through a pore having the large pore diameter. In an electrochemical element in which dendrites are likely to occur, such as a lithium ion battery, dendrites formed from the electrodes are considered to easily pass through a pore having the large pore diameter to short circuit the positive electrode and the negative electrode.

Further, a pore having a large pore diameter and its surrounding part in a nonwoven fabric are weak in strength, and cracks easily occur. Therefore, it is considered that a separator for an electrochemical element consisting of a nonwoven fabric having a large maximum pore diameter is likely to have an electric short circuit due to formation of cracks.

Furthermore, in a separator for an electrochemical element consisting of a nonwoven fabric having a wide pore diameter distribution, respective pore diameters of pores present in the separator for an electrochemical element are largely different from each other, so that ion permeability of respective pores is largely different from each other, and therefore, the ion permeability of respective areas in the separator for an electrochemical element is likely to be non-uniform. As a result, it is considered that an electrochemical element provided with the separator for an electrochemical element may have higher electric resistance between the electrodes than intended.

Thus, the present invention has been made in view of the above circumstances. An object of the present invention is to provide a separator for an electrochemical element capable of providing an electrochemical element in which an electric short circuit more hardly occurs and higher electric resistance between the electrodes than intended is prevented, compared with a separator for an electrochemical element according to the conventional technology.

Solution to the Problem

The present invention is related to a separator for an electrochemical element, comprising a fibrous structure, wherein the fibrous structure has a first fibrous layer part in which short fibers and/or pulp-like fibers are intertwined with each other, and a second fibrous layer part; some of the short fibers and/or the pulp-like fibers constituting the first fibrous layer part penetrates the second fibrous layer part; and a pore diameter distribution of the fibrous structure satisfies the following formula:

$$0 \ \mu m < D\max < 18 \ \mu m, \text{ and}$$

$$0 \ \mu m \leq (D\max - D\text{ave}) < 13 \ \mu m$$

wherein Dmax is a maximum pore diameter (μm) of the fibrous structure, and Dave is an average pore diameter (μm) of the fibrous structure.

In the separator for an electrochemical element according to the present invention, a percentage by mass of the pulp-like fibers in relation to the constituent fibers of the first fibrous layer part is preferably 10% by mass or more.

Further, in the separator for an electrochemical element according to the present invention, the pulp-like fibers may be pulp-like fibers of an aramid resin.

Still further, in the separator for an electrochemical element according to the present invention, the fibrous structure may comprise particles.

Advantageous Effects of the Invention

A fibrous structure constituting the separator for an electrochemical element according to the present invention has a small pore diameter by including a first fibrous layer part in which short fibers and/or pulp-like fibers are intertwined with each other. Therefore, the separator for an electrochemical element comprising the fibrous structure according to the present invention can provide an electrochemical element in which an electric short circuit hardly occurs.

Further, a fibrous structure constituting the separator for an electrochemical element according to the present invention has a second fibrous layer part, and has a structure in which some of the short fibers and/or the pulp-like fibers constituting the first fibrous layer part penetrates the second fibrous layer part. Thereby, the first fibrous layer part is effectively reinforced by the second fibrous layer part. The separator for an electrochemical element having the fibrous structure according to the present invention is excellent in strength and hardly cracked, so that an electrochemical element in which an electric short circuit hardly occurs, can be provided.

A maximum pore diameter of the fibrous structure constituting the separator for an electrochemical element according to the present invention, is larger than 0 μm and less than 18 μm. Thereby, the separator for an electrochemical element according to the present invention can prevent an electric short circuit caused by direct contact between a positive electrode and a negative electrode, an electric short circuit caused by dendrites, and an electric short circuit caused by formation of cracks, so that an electrochemical element in which an electric short circuit more hardly occurs, can be provided.

Further, a difference between a maximum pore diameter and an average pore diameter of the fibrous structure constituting the separator for an electrochemical element according to the present invention, is 0 μm or more and less than 13 μm, and the fibrous structure has a narrow pore diameter distribution. Thereby, the separator for an electrochemical element according to the present invention can provide an electrochemical element in which an electrical resistance between the electrodes is prevented from becoming higher than intended.

In the case where the first fibrous layer part according to the present invention contains pulp-like fibers, as a percentage by mass of the pulp-like fibers in the constituent fibers of the first fibrous layer part is larger, the fibrous structure becomes denser. In addition, there is a tendency that various pore diameters can be made smaller, and a difference between a maximum pore diameter and an average pore diameter can be made smaller, and further a difference between an average pore diameter and a minimum pore diameter, and a difference between a maximum pore diameter and a minimum pore diameter, can be made smaller. Therefore, an electrochemical element in which an electric short circuit more hardly occurs and higher electric resistance between the electrodes than intended is prevented, can be provided by a separator for an electrochemical element, comprising a fibrous structure having a first fibrous layer part wherein a percentage by mass of the pulp-like fibers in relation to the constituent fibers of the first fibrous layer part is 10% by mass or more.

Furthermore, the fibrous structure constituting the separator for an electrochemical element according to the present invention has heat resistance and high strength, by the first fibrous layer part containing pulp-like fibers of an aramid resin. Thereby, a separator for an electrochemical element excellent in heat resistance in which an electric short circuit more hardly occurs, can be provided.

When a fibrous structure according to the present invention comprises particles, the fibrous structure constituting the separator for an electrochemical element according to the present invention has a tendency that a maximum pore diameter and a minimum pore diameter are small and the fibrous structure has a narrow pore diameter distribution. Thereby, an electrochemical element in which an electric short circuit more hardly occurs, and higher electric resistance between the electrodes than intended is prevented, can be provided. In addition, an electrochemical element having functionality exhibited by the provided particles can be provided, by the separator for an electrochemical element according to the present invention.

DESCRIPTION OF THE INVENTION

Figure 1:
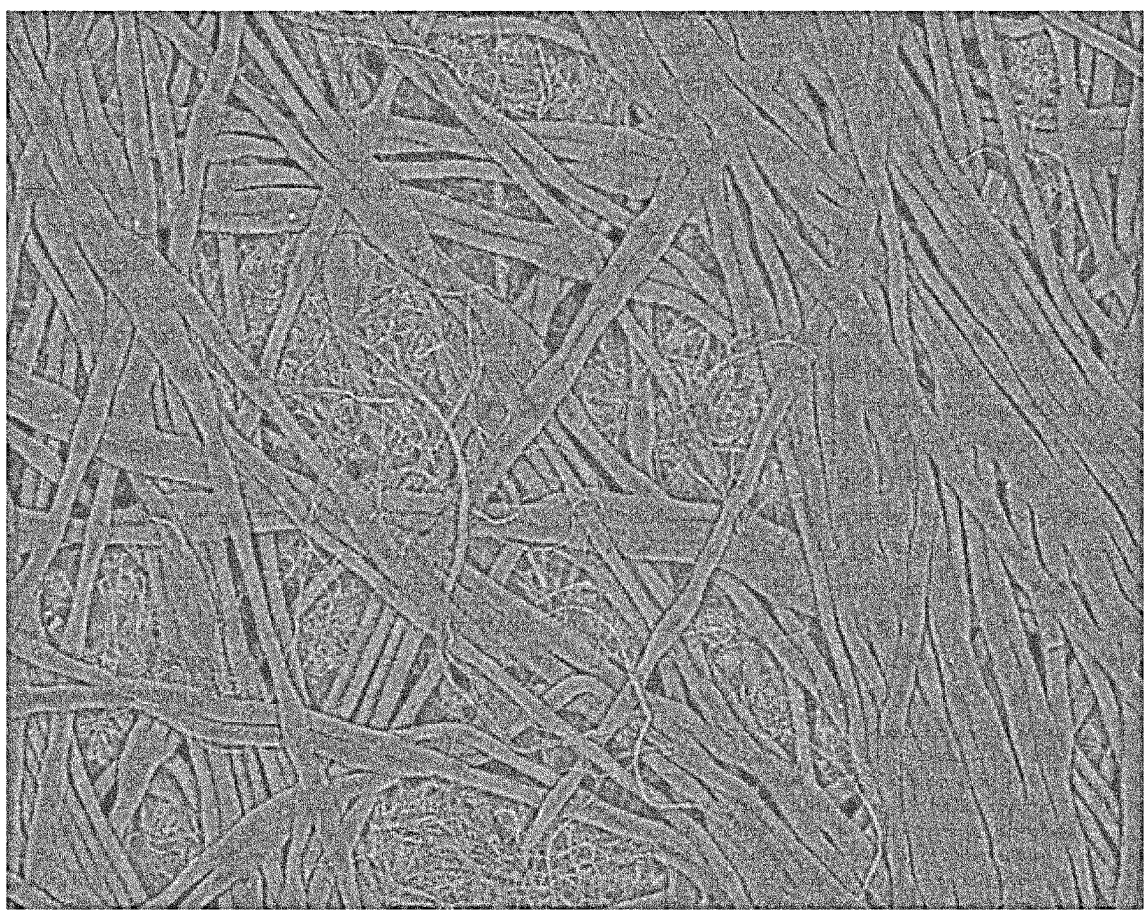
FIG. 1 is a scanning electron microscope photograph with a magnification of 500 times of the main surface of the exposed second fibrous layer part in the separator for an electrochemical element prepared in Example 1.

In the present invention, various constitutions such as the following constitutions may be appropriately selected.

A fibrous structure constituting the separator for an electrochemical element according to the present invention may be a sheet-like fabric, for example, a fiber web, a nonwoven fabric, a woven fabric or a knitted fabric. The fibrous structure may consist of only one kind of these fabrics, or may be constituted by laminating a plurality of fabrics and/or plural kinds of fabrics.

An embodiment of lamination may be appropriately selected. The embodiment of lamination may be an embodiment in which fabric layers are simply overlapped; an embodiment in which fabric layers are integrated with a binder; an embodiment in which fabric layers are integrated by intertwining the constituent fibers of the fabric layers with extending beyond the layers; an embodiment in which fabric layers are integrated by inter-fiber adhesion performed by thermal melting of the constituent fibers of the fabric layers; an embodiment in which fabric layers are integrated by ultrasonic adhesion; or the like.

The fibrous structure according to the present invention comprises a first fibrous layer part having short fibers and/or pulp-like fibers. Short fiber as used in the present invention refers to a fiber having a fiber length of 20 mm or less. Pulp-like fiber refers to a fiber having numerous microtine fibers (fibrils) generated from one fiber by a mechanical shear force or the like.

As fineness of the short fibers is smaller and/or a fiber length of the short fibers is shorter, the fibrous structure becomes denser. Further, there is a tendency that various pore diameters can be made smaller, and a difference between a maximum pore diameter and an average pore diameter can be made smaller, and further a difference between an average pore diameter and a minimum pore diameter, and a difference between a maximum pore diameter and a minimum pore diameter, can be made smaller.

Therefore, the fineness of the short fibers is preferably 5 d or less, more preferably 2 d or less, and even more preferably 1 d or less. On the other hand, the lower limit value of the fineness of the short fibers may be appropriately selected, but it is realistically 0.01 d or more.

The fiber length of the short fibers is preferably 15 mm or less, more preferably 10 mm or less, and even more preferably 5 mm or less. On the other hand, the lower limit value of the fiber length of the short fibers may be appropriately selected, but it is realistically 0.5 mm or more.

The short fibers may be fibers comprising a known resin such as a polyolefin resin (a polyethylene, a polypropylene, a polymethylpentene, a polyolefin resin having a structure in which a part of the hydrocarbon is substituted with cyano or a halogen such as fluorine and chlorine, etc.), a styrene resin, a polyether resin (a polyether ether ketone, a polyacetal, a phenol resin, a melamine resin, an urea resin, an epoxy resin, a modified polyphenylene ether, an aromatic polyether ketone, etc.), a polyester resin (a polyethylene terephthalate, a polytrimethylene terephthalate, a polybutylene terephthalate, a polyethylene naphthalate, a polybutylene naphthalate, a polycarbonate, a polyarylate, a wholly aromatic polyester resin, an unsaturated polyester resin, etc.), a polyimide resin, a polyamideimide resin, a polyamide resin (an aromatic polyamide resin such as an aramid resin, an aromatic polyether amide resin, a nylon resin, etc.), a resin having a nitrile group (a polyacrylonitrile, etc.), an urethane resin, an epoxy resin, a polysulfone resin (a polysulfone, a polyethersulfone, etc.), a fluorine-based resin (a polytetrafluoroethylene, a polyvinylidene fluoride, etc.), a cellulose resin, a polybenzimidazole resin, an acrylic resin (a polyacrylonitrile resin obtained by copolymerizing an acrylic acid ester or methacrylic acid ester or the like, a modacrylic resin obtained by copolymerizing acrylonitrile and vinyl chloride or vinylidene chloride, etc.), and the like. The short fibers may be fibers composed of a single resin, or may be fibers composed of plural types of resins such as a mixed resin.

These resins may be composed of either a linear polymer or a branched polymer. These resins may be a block copolymer or a random copolymer. Further, these resins may be any resins having any three-dimensional structure of the resin and presence or absence of crystallinity.

The short fibers may be single fibers or conjugate fibers. A conjugate fiber includes, for example, a core-sheath type conjugate fiber, a sea-island type conjugate fiber, a side-by-side type conjugate fiber, an orange type conjugate fiber, a bimetal type conjugate fiber, or the like. When these fibers are splittable fibers, the fibrous structure may contain an unsplitted conjugate fiber as short fibers, or the conjugate fiber may contain a fiber obtained by split by a mechanical force or the like.

The short fibers may include a substantially circular fiber or an elliptical fiber, or a further modified cross section fiber, regarding the cross section shape of the short fibers. Examples of the modified cross section fiber include fibers having a fiber cross section shape including a polygonal shape such as a triangular shape, an alphabetic character shape such as a Y shape, an irregular shape, a multi-leaf shape, a symbolic shape such as an asterisk shape, or a shape in which a plurality of these shapes are combined.

The first fibrous layer part can have a higher strength, by an embodiment having the first fibrous layer part in which the fibrous structure comprises short fibers, more preferably an embodiment in which a second fibrous layer part also comprises short fibers as constituent fibers, compared with an embodiment containing only pulp-like fibers as constituent fibers. Further, existence of short fibers can prevent a portion protruding from the electrode surface from penetrating the separator for an electrochemical element at the time of lamination with the electrode or winding, and thereby, a separator for an electrochemical element capable of providing an electrochemical element in which an electric short circuit hardly occurs, can be preferably provided.

In particular, when the short fibers have a function of adhering the short fibers and/or the pulp-like fibers constituting the first fibrous layer part to each other by heating or the like, the first fibrous layer part can have a higher strength by adhering the constituent fibers of the first fibrous layer part to each other, and thereby a separator for an electrochemical element capable of providing an electrochemical element in which an electric short circuit more hardly occurs, can be preferably provided.

An embodiment of fiber adhesion by short fibers may be appropriately selected. When the short fibers are adhered to each other without melting, it can be preferably prevented that openings in the first fibrous layer part are blocked by a molten resin, and electric resistance between the electrodes of the separator for an electrochemical element increases unintentionally.

The separator for an electrochemical element having a first fibrous layer part in which the short fibers are adhered to each other without melting, can be provided by heating the short fibers at a temperature equal to or higher than the glass transition temperature of the resin constituting the short fibers (specifically, a polyethylene terephthalate resin, etc.) and below the melting point of the resin, if necessary, pressing in addition to heating.

From the viewpoint that openings in the first fibrous layer part can be prevented from being blocked by the molten resin, the first fibrous layer part in which fibers are adhered to each other by short fibers without using a binder and without melting short fibers, is more preferable.

When the first fibrous layer part includes pulp-like fibers, as freeness of the pulp-like fibers is smaller, the fibrous structure becomes denser. In addition, various pore diameters can be made smaller, and a difference between a maximum pore diameter and an average pore diameter can be made smaller, and further a difference between an average pore diameter and a minimum pore diameter, and a difference between a maximum pore diameter and a minimum pore diameter, can be made smaller.

Therefore, the first fibrous layer part preferably comprises pulp-like fibers. In that case, freeness of the pulp-like fibers is preferably 500 ml CSF or less, more preferably 400 ml CSF or less, and even more preferably 300 ml CSF or less. On the other hand, the lower limit value of freeness of pulp-like fibers may be appropriately selected, but it is realistically 0.1 ml CSF or more.

"Freeness" in the present invention refers to a value measured by the Japanese Industrial Standard: JIS P 8121 Canadian Standard Freeness Tester.

Pulp-like fibers may be fibers comprising the above mentioned known resin, like short fibers. From the viewpoint of a low moisture content, pulp-like fibers such as an aramid resin, a polyolefin resin, an acrylic resin, a liquid crystal polyester resin and the like, are preferable. Particularly, when a fibrous structure has heat resistance and high strength, a separator for an electrochemical element excellent in heat resistance in which an electric short circuit hardly occurs, can be easily provided, so that the first fibrous layer part preferably contains pulp-like fibers of an aramid resin.

The first fibrous layer part may contain respectively one type of short fibers and/or one type of pulp-like fibers as constituent fibers, or may contain plural types of short fibers and/or plural types of pulp-like fibers.

The first fibrous layer part in the present invention has a structure in which short fibers and/or pulp-like fibers are intertwined.

Here, an embodiment in which short fibers and/or pulp-like fibers are intertwined, means an embodiment in which short fibers and/or pulp-like fibers are randomly intertwined like a fiber web or a nonwoven fabric; or an embodiment in which short fibers and/or pulp-like fibers are regularly intertwined like a woven fabric and a knitted fabric.

In particular, the first fibrous layer part is preferably a fibrous layer derived from a fiber web or a nonwoven fabric, more preferably a fibrous layer derived from a fiber web or a nonwoven fabric obtained by a wetlaid process, so as to easily provide a fibrous structure in which some of short fibers and/or pulp-like fibers penetrates deeply into the second fibrous layer part as described later.

An embodiment of respective fibers constituting the first fibrous layer part may be appropriately selected. It may be an embodiment in which respective fibers are simply intertwined; an embodiment in which respective fibers are adhered by short fibers as mentioned above; an embodiment in which respective fibers are integrated with a binder; an embodiment in which some of fibers or all of fibers are adhered; or the like.

When the first fibrous layer part contains pulp-like fibers, as a percentage by mass of the pulp-like fibers in the constituent fibers of the first fibrous layer part is larger, the fibrous structure becomes denser. In addition, there is a tendency that various pore diameters can be made smaller, and a difference between a maximum pore diameter and an average pore diameter can be made smaller, and further a difference between an average pore diameter and a minimum pore diameter, and a difference between a maximum pore diameter and a minimum pore diameter, can be made smaller.

Therefore, a percentage by mass of the pulp-like fibers in relation to the constituent fibers of the first fibrous layer part is preferably 10% by mass or more, more preferably 20% by mass or more, and further preferably 50% by mass or more. The upper limit value may be appropriately adjusted, but it may be 100% by mass or less, 95% by mass or less, or 90% by mass or less.

The first fibrous layer part may be a fibrous layer composed of only short fibers and/or pulp-like fibers as constituent fibers, or may be a fibrous layer composed of short fibers and/or pulp-like fibers as well as other fibers as constituent fiber. A type of the other fibers may be appropriately selected, but it may be long fibers or fibers having a continuous length.

The first fibrous layer part may contain adhesive fibers. Examples of the adhesive fibers, include a composite fiber such as a core-sheath fiber or a side by side fiber of a high melting point resin and a low melting point resin; or, for example, an undrawn fiber composed of only a resin which melts or softens at a temperature lower than the melting point or the softening point of the short fibers and/or the pulp-like fibers; or the like. When the first fibrous layer part contains adhesive fibers, adhesion of the short fibers and/or the pulp-like fibers by the adhesive fibers improves the strength of the first fibrous layer part, whereby a separator for an electrochemical element in which an electric short circuit hardly occurs, can be provided.

When the first fibrous layer part contains fibers other than short fibers and/or pulp-like fibers, a percentage by mass of the fibers other than short fibers and/or pulp-like fibers in the constituent fibers of the first fibrous layer part may be appropriately selected.

The first fibrous layer part may contain a binder. When the first fibrous layer part contains a binder, adhesion of the constituent fibers by the binder improves the strength of the first fibrous layer part, whereby a separator for an electrochemical element in which an electric short circuit hardly occurs, can be provided.

A method of preparing the first fibrous layer part containing a binder may be appropriately selected. A method of applying binder powders, a binder solution or a molten binder to the first fibrous layer part by loading, coating or impregnation may be adopted. A mass of the binder contained in the first fibrous layer part may be appropriately selected. It is preferably 0.1 to 35 $g/m^2$, more preferably 0.1 to 25 $g/m^2$, and even more preferably 0.1 to 15 $g/m^2$.

A basis weight of the first fibrous layer part may be appropriately selected. However, when the basis weight is too small, as the constituent fibers are less, a fibrous structure excellent in strength can hardly be provided, and as a result, it may be difficult to provide a separator for an electrochemical element capable of providing an electric element in which an electric short circuit hardly occurs. On the other hand, when the basis weight is too large, air permeability decreases, and resistance of ion passage unintentionally increases, so that it may be difficult to provide a separator for an electrochemical element capable of providing an electrochemical element having low electric resistance between electrodes.

Therefore, a basis weight of the first fibrous layer part is preferably 0.5 to 40 $g/m^2$, more preferably 1 to 30 $g/m^2$, and even more preferably 2 to 20 $g/m^2$.

Basis weight in the present invention refers to a basis weight obtained based on the method defined in the Japanese Industrial Standard: JIS P 8124 (Paper and Paperboard—Method of Measuring Basis Weight).

The second fibrous layer part in the fibrous structure is a part mainly supporting and reinforcing the first fibrous layer part. The second fibrous layer part may be a sheet-like fabric, for example, a fibrous layer derived from a fiber web or a nonwoven fabric, a woven fabric or a knitted fabric.

A type of fibers constituting the second fibrous layer part may be appropriately selected. The fibers may be short fibers and pulp-like fibers described above as well as long fibers or fibers having a continuous length.

The second fibrous layer part can have a higher strength, by an embodiment having a second fibrous layer part in which the fibrous structure comprises short fibers. Further, existence of short fibers can prevent a portion protruding from the electrode surface from penetrating the separator for an electrochemical element at the time of lamination with the electrode or winding, and thereby, a separator for an electrochemical element capable of providing an electrochemical element in which an electric short circuit hardly occurs, can be preferably provided.

In particular, when the short fibers have a function of adhering the short fibers and/or the other fibers constituting the second fibrous layer part to each other by heating or the like, the second fibrous layer part can have a higher strength by adhering the constituent fibers of the second fibrous layer part to each other, and thereby a separator for an electrochemical element capable of providing an electrochemical element in which an electric short circuit more hardly occurs, can be preferably provided.

An embodiment of fiber adhesion by short fibers may be appropriately selected. When the short fibers are adhered to each other without melting, it can be preferably prevented that openings in the second fibrous layer part are blocked by a molten resin, and electric resistance between the electrodes of the separator for an electrochemical element increases unintentionally.

The separator for an electrochemical element having the second fibrous layer part in which short fibers are adhered to each other without melting, can be provided by heating the short fibers at a temperature equal to or higher than the glass transition temperature of the resin constituting the short fibers (specifically, a polyethylene terephthalate resin, etc.) and below the melting point of the resin, if necessary, pressing in addition to with heating.

From the viewpoint that openings in the second fibrous layer part can be prevented from being blocked by the molten resin, the second fibrous layer part in which fibers are adhered to each other by short fibers without using a binder and without melting short fibers, is more preferable.

In particular, the second fibrous layer part is preferably a fibrous layer derived from a fiber web or a nonwoven fabric, more preferably a fibrous layer derived from a fiber web or a nonwoven fabric obtained by a wetlaid process, so as to easily provide a fibrous structure in which some of short fibers and/or pulp-like fibers penetrates deeply into the second fibrous layer part as described later.

An embodiment of respective fibers constituting the second fibrous layer part may be appropriately selected. It may be an embodiment in which respective fibers are simply intertwined; an embodiment in which respective fibers are adhered by short fibers as mentioned above; an embodiment in which respective fibers are integrated with a binder; an embodiment in which some of fibers or all of fibers are adhered; or the like.

As the fineness of the fibers constituting the second fibrous layer part is smaller and/or the fiber length of the fibers is shorter, the fibrous structure becomes denser. Further, there is a tendency that various pore diameters can be made smaller, and a difference between a maximum pore diameter and an average pore diameter can be made smaller, and further a difference between an average pore diameter and a minimum pore diameter, and a difference between a maximum pore diameter and a minimum pore diameter, can be made smaller.

Therefore, the fineness of the fibers is preferably 5 d or less, more preferably 2 d or less, and even more preferably 1 d or less. On the other hand, the lower limit value of the fineness of the fibers may be appropriately selected, but it is realistically 0.01 d or more.

A fiber length of the fibers is preferably 20 mm or less, more preferably 15 mm or less, and even more preferably 10 mm or less. On the other hand, the lower limit value of the fiber length of the fibers may be appropriately selected, but it is realistically 0.5 mm or more.

The second fibrous layer part may contain adhesive fibers. Examples of the adhesive fibers, include a composite fiber such as a core-sheath fiber or a side by side fiber of a high melting point resin and a low melting point resin; or, for example, an undrawn fiber composed of only a resin which melts or softens at a temperature lower than the melting point or softening point of the constituent fibers of the second fibrous layer part; or the like. When the second fibrous layer part contains adhesive fibers, adhesion of the constituent fibers by the adhesive fibers improves the strength of the second fibrous layer part, whereby a separator for an electrochemical element in which an electric short circuit hardly occurs, can be provided.

When the second fibrous layer part contains adhesive fibers, a percentage by mass of the adhesive fibers in the constituent fibers of the second fibrous layer part may be appropriately selected.

The second fibrous layer part may contain a binder. When the second fibrous layer part contains a binder, adhesion of the constituent fibers by the binder improves the strength of the second fibrous layer part, whereby a separator for an electrochemical element in which an electric short circuit hardly occurs, can be provided.

A method of preparing the second fibrous layer part containing a binder may be appropriately selected. A method of applying binder powders, a binder solution or a molten binder to the second fibrous layer part by loading, coating or impregnation may be adopted. A mass of the binder contained in the second fibrous layer part may be appropriately selected. It is preferably 1 to 50 $g/m^2$, more preferably 2 to 40 $g/m^2$, and even more preferably 3 to 30 $g/m^2$.

A basis weight of the second fibrous layer part may be appropriately selected. It is preferably 1 to 50 $g/m^2$, more preferably 2 to 40 $g/m^2$, and even more preferably 3 to 30 $g/m^2$.

In the fibrous structure according to the present invention, some of short fibers and/or pulp-like fibers constituting the first fibrous layer part penetrates the second fibrous layer part. With this structure, the first fibrous layer part is firmly integrated with the second fibrous layer part, so that the first fibrous layer part is effectively reinforced by the second fibrous layer part, to provide a separator for an electrochemical element capable of providing an electrochemical element in which an electric short circuit more hardly occurs.

"Some of the short fibers and/or the pulp-like fibers constituting the first fibrous layer part penetrates the second fibrous layer part", can be determined, in the case where observing the cross section in the thickness direction of the fibrous structure comprising the first fibrous layer part and the second fibrous layer part, some of the short fibers and/or the pulp-like fibers constituting the first fibrous layer part is present in the second fibrous layer part in the fibrous structure (for example, in the case where it is present from the first fibrous layer part to the main surface on the second fibrous layer part side of the fibrous structure).

In particular, when some of the short fibers and/or pulp-like fibers constituting the first fibrous layer part penetrates deeply into the second fibrous layer part until being exposed on the main surface on the side opposite to the first fibrous layer part side of the second fibrous layer part, the first fibrous layer part can be more firmly integrated with the second fibrous layer part, to provide preferably a separator for an electrochemical element capable of providing an electrochemical element in which an electric short circuit more hardly occurs.

In addition, the fibrous structure having such a structure, has uniform liquid retention amounts in the first fibrous layer part and the second fibrous layer, and is excellent in the liquid retention performance. Therefore, the separator for an electrochemical element comprising the fibrous structure having the constitution of the present invention is excellent in the liquid retention performance of an electrolyte, so that an electrochemical element having a long battery life, in which an electrogenic reaction can be smoothly performed without shortage of the electrolyte, may be provided.

In the item of "Method of determining presence or absence of pinholes", deep penetration of some of short fibers and/or pulp-like fibers constituting the first fibrous layer part into the second fibrous layer part until being exposed on the main surface on the side opposite to the first fibrous layer part side of the second fibrous layer part, can be determined, in the case where it is confirmed that the short fibers and/or the pulp-like fibers are exposed on the main surface on the exposed side of the second fibrous layer part in the scanning electron microscopic photograph of the main surface derived from the second fibrous layer part.

The fibrous structure may have a structure comprising only the first fibrous layer part and the second fibrous layer part described above, or may have a structure additionally comprising other member(s) such as a reinforcing layer or the like separately. Further, the fibrous structure may have a functional material such as particles, or an adhesive material such as a binder that can adhere between layers or fibers, or bind the functional material to the fibrous structure.

A kind of the particles such as inorganic particles, etc. which the fibrous structure may include, a method of loading and a loading mass may be appropriately selected. For example, the kind of the inorganic particles is not limited because it may be appropriately selected, but examples thereof include an oxide such as iron oxide, $SiO_2$ (silica), $Al_2O_3$ (alumina), alumina-silica composite oxide, $TiO_2$, $SnO_2$, $BaTiO_2$, $ZrO_2$, tin-indium oxide (ITO) and lithium titanate (LTO); a nitride such as aluminum nitride and silicon nitride; a poorly soluble ionic crystal such as calcium fluoride, barium fluoride and barium sulfate; a covalent crystal such as silicon and diamond; a clay such as talc and montmorillonite; a substance derived from a mineral resource such as boehmite, zeolite, apatite, kaolin, mullite, spinel, olivine, sericite, bentonite and mica, or an artificial material thereof; an oxide of an inorganic material such as a metal oxide; or the like.

In particular, as disclosed in WO 2009/066916 (JP 2011-503828), a separator for an electrochemical element formed by coating at least one surface of a fiber assembly such as a nonwoven fabric with electrode active material particles performing electrochemical oxidation or reduction reaction, is preferable. Examples of the electrode active material particles include anode active material particles selected from the group consisting of natural graphite, artificial graphite, a carbonaceous material, lithium titanate (LTO), silicon (Si) and tin (Sn), and a mixture thereof, or the like. By such a separator for an electrochemical element, thermal stability can be improved, and reduction of battery capacity can be improved. Therefore, a fibrous structure obtained by applying the above described electrode active material particles on at least one side thereof, is preferable for realizing such a separator for an electrochemical element.

Effects exhibited by a separator for an electrochemical element having a fiber assembly such as a nonwoven fabric obtained by applying the above described electrode active material particles on at least one side thereof, are also described in WO 2009/048263 (JP 2011-501349), WO 2013/021299 (JP 2014-527266), etc.

An average particle diameter ($D_{50}$) of primary particles included in the fibrous structure may be appropriately adjusted depending on a kind of the particles, a kind of the separator for an electrochemical element, performance and properties required for the separator for an electrochemical element. The average particle diameter may be 10 μm or less, 8 μm or less, or 5 μm or less. The lower limit value thereof may be appropriately adjusted, but it is realistically 50 nm or more. An average particle diameter ($D_{50}$) of primary particles of the electrode active material particles included in the fibrous structure may be also appropriately adjusted depending on a type of the particles, a type of the separator for an electrochemical element, performance and properties required for the separator for an electrochemical element. The average particle diameter may be in the range of 50 nm to 2 μm, as disclosed in WO 2013/021299 (JP 2014-527266), etc.

"Average particle diameter ($D_{50}$) of primary particles" in the present invention refers to a value obtained from the particle diameter measurement data obtained from the scattering intensity by a continuous measurement for 3 minutes under a dynamic light scattering method using FPRA 1000 (measurement range: 3 nm to 5,000 nm) manufactured by Otsuka Electronics Co., Ltd. More specifically, a particle diameter measurement is performed 5 times, and the particle diameter measurement data obtained by the measurement are arranged in the order from data having the narrowest particle diameter distribution width to data having the broadest one. Then, the data having the third narrowest particle diameter distribution width are selected, and a particle diameter at the cumulative 50% point of the particles in the selected data is defined as an average particle diameter of the primary particles (hereinafter sometimes abbreviated as $D_{50}$). A measurement solution used for the measurement is adjusted to a temperature of 25° C., and a pure water at 25° C. is used as a blank for scattering intensity. When a particle diameter is described in a web page, a catalog or the like by a manufacturer or a trading company of the particles to be measured, the particle diameter may be regarded as an average particle diameter ($D_{50}$) of the primary particles.

An embodiment of caning the particles may be appropriately selected. It may be an embodiment in which the particles are simply present on the fiber surface without using an adhesive material such as a binder; an embodiment in which the particles are adhered and integrated on the fiber surface by a binder; or the like.

An embodiment of existence of the particles in the fibrous structure may also be appropriately selected. It may be an embodiment in which the particles are mainly present in either one of the first fibrous layer part and the second fibrous layer part; an embodiment in which the particles are present approximately uniformly in whole the fibrous structure; an embodiment in which the particles are present such that an existence amount of the particles decreases from one main surface of the fibrous structure toward the other main surface; or the like.

A loading mass of the particles included in the fibrous structure is not particularly limited, but it may be 0.1 $g/m^2$ or more, 0.5 $g/m^2$ or more, or 1 $g/m^2$ or more. On the other hand, the upper limit value of the loading mass may be appropriately adjusted.

The separator for an electrochemical element having a fibrous structure loading the particles as described above may have a smaller maximum pore diameter and a smaller minimum pore diameter and a narrower pore diameter distribution. Therefore, by the separator for an electrochemical element according to the present constitution, an electrochemical element having functionality exhibited by the provided particles in which an electric short circuit hardly occurs, and higher electric resistance between the electrodes than intended is prevented, can be preferably provided.

Thickness of the fibrous structure may be appropriately selected. The thickness is preferably 150 μm or less, more preferably 100 μm or less, and even more preferably 50 μm or less, so as to be a separator for an electrochemical element capable of providing an electrochemical element having a low internal resistance due to low thickness. On the other hand, when the thickness is too thin, the strength decreases and cracks tend to occur in the separator for an electrochemical element. Therefore, the thickness is realistically 5 μm or more.

"Thickness" in the present invention refers to an arithmetic average value of values of randomly selected 10 points measured at 5 N load using an outside micrometer (0 to 25 mm) defined in the Japanese Industrial Standard: JIS B 7502: 1994.

A basis weight of the fibrous structure may be appropriately selected, but it may be 1 to 50 g/m², 2 to 40 g/m², or 3 to 30 g/m².

Porosity of the fibrous structure may be appropriately selected. The porosity is preferably 20% or more, more preferably 30% or more, and even more preferably 40% or more, so as to be a separator for an electrochemical element capable of providing an electrochemical element having low internal resistance due to its low resistance of ion passage. On the other hand, when the porosity is too high, the strength decreases and cracks tend to occur in the separator for an electrochemical element. Therefore, the porosity is realistically 80% or less.

"Porosity" in the present invention refers to a value obtained by the following formula:

$$\text{Porosity } (P) = \{1 - W/(T \times d)\} \times 100$$

wherein W is a basis weight (g/m²) of the measurement object, T is a thickness (μm) of the measurement object, and d is a mass average density (g/cm³) of the material constituting the measurement object. For example, a mass average density (d) is calculated by the following formula:

$$\text{Mass average density } (d) = 1/\{(a/100/d1) + (b/100/d2)\}$$

in the case where a parts by mass of the resin A having a density d1 and b parts by mass of the resin B having a density d2 are present in 100 parts by mass of the material.

Air permeability of the fibrous structure may be appropriately selected. When the air permeability is too low, ions in the electrolyte hardly pass therethrough, whereby a separator for an electrochemical element capable of providing an electrochemical element having low electric resistance between the electrodes is difficult to be provided. Therefore, the air permeability is preferably 0.05 cm³/cm²/sec or more, more preferably 0.07 cm³/cm²/sec or more, and even more preferably 0.1 cm³/cm²/sec or more. The upper limit value of the air permeability is not limited from the viewpoint of the ion passage performance, but it is realistically 50 cm³/cm²/sec or less, so as to prevent the strength of a separator for an electrochemical element from being too low.

Air permeability in the present invention is a value calculated from the air permeability when subjected to a pressure of 125 Pa by a Frazier air permeability tester, which is an air amount defined under the Japanese Industrial Standard: JIS L 1096: 1999 8.27.1 Method A (Frazier method).

In a separator for an electrochemical element comprising a fibrous structure having pinholes, high air permeability tends to be exhibited as a fluid easily passes through pinholes. At first glance, the separator for an electrochemical element comprising such a fibrous structure seems to be able to provide an electrochemical element having low internal resistance due to its low resistance of ion passage. However, an electrochemical element comprising such a separator for an electrochemical element easily has an electric short circuit due to existence of pinholes, and ion permeability of each portion of the separator for an electrochemical element tends to become non-uniform. Therefore, the air permeability which is considered preferable as defined above, is a value in a separator for an electrochemical element prepared using a fibrous structure having no pinholes.

The fibrous structure in the present invention has a pore diameter distribution satisfying the following formula:

$$0 \text{ μm} < D\text{max} < 18 \text{ μm, and}$$

$$0 \text{ μm} \leq (D\text{max} - D\text{ave}) < 13 \text{ μm}$$

wherein Dmax is a maximum pore diameter (μm) of the fibrous structure, and Dave is an average pore diameter (μm) of the fibrous structure.

In the present invention, the average pore diameter of the fibrous structure refers to an average flow pore diameter measured by a bubble point method. The maximum pore diameter of the fibrous structure refers to a maximum flow pore diameter measured by the same method as described above, and the minimum pore diameter of the fibrous structure refers to a minimum flow pore diameter measured by the same method as described above. The average flow pore diameter, the maximum flow pore diameter, and the minimum flow pore diameter can be measured by using a polometer manufactured by Coulter.

An electrochemical element in which an electric short circuit hardly occurs, can be provided by a separator for an electrochemical element having a fibrous structure having a maximum pore diameter less than 18 μm. As the maximum pore diameter is smaller, a separator for an electrochemical element capable of providing an electrochemical element in which an electric short circuit more hardly occurs, can be provided. Therefore, the maximum pore diameter is preferably 17 μm or less, more preferably 15 μm or less, and even more preferably 11 μm or less. On the other hand, the maximum pore diameter is larger than 0 μm, but it is realistically 0.5 μm or more.

An average pore diameter of the fibrous structure may be appropriately selected. As the average pore diameter is smaller, a separator for an electrochemical element capable of providing an electrochemical element in which an electric short circuit hardly occurs, can be provided. Therefore, the average pore diameter is preferably 15 μm or less, more preferably 10 μm or less, even more preferably 5 μm or less, and most preferably 4 μm or less. On the other hand, the average pore diameter is larger than 0 μm, but it is realistically 0.5 μm or more. The average pore diameter is equal to or less than the maximum pore diameter.

A fibrous structure having a difference between the maximum pore diameter and the average pore diameter of the fibrous structure of 0 μm or more and less than 13 μm, has a uniform pore diameter. Therefore, ion permeability in a separator for an electrochemical element comprising the fibrous structure is uniform, so that a separator for an electrochemical element capable of providing an electrochemical element preventing higher electric resistance between the electrodes than intended, can be provided.

As a difference between the maximum pore diameter and the average pore diameter of the fibrous structure is smaller, the fibrous structure has more uniform pore diameter. Therefore, the difference is preferably 10 μm or less, more preferably 8 μm or less, even more preferably 7 μm or less, and most preferably 4 μm or less.

A minimum pore diameter of the fibrous structure may be appropriately selected, but it may be 0.1 to 9 μm, 0.2 to 7 μm, or 0.5 to 5 μm. The minimum pore diameter is equal to or less than the average pore diameter or the the maximum pore diameter.

As the fibrous structure having a difference between the minimum pore diameter and the average pore diameter of the fibrous structure of 0 μm or more and less than 13 μm has a more uniform pore diameter, ion permeability in a separator for an electrochemical element comprising the fibrous structure is uniform, so that a separator for an electrochemical element capable of providing an electrochemical element preventing higher electric resistance between the electrodes than intended, can be provided.

Therefore, a difference between the minimum pore diameter and the average pore diameter of the fibrous structure is preferably 8 μm or less, more preferably 6 μm or less, further preferably 4 μm or less, and most preferably 3 μm or less.

Furthermore, from the viewpoint of possession of a narrow pore diameter distribution, a difference between the minimum pore diameter and the maximum pore diameter of the fibrous structure is preferably less than 15 more preferably 10 μm or less, even more preferably 8 μm or less, further more preferably 6 μm or less, and most preferably 4 μm or less.

As the fibrous structure having the constitution of the present invention has a small difference between the minimum pore diameter and the average pore diameter and a small difference between the minimum pore diameter and the maximum pore diameter, the fibrous structure has a uniform and dense structure having a small distance between constituent fibers, in which pinholes being linear through holes formed from one main surface to the other main surface, hardly exist.

Therefore, even when using a thin fibrous structure having a thickness of 20 μm or less, in order to provide a thin separator for an electrochemical element having a thickness of, for example, 20 μm or less, a separator for an electrochemical element having no pinholes can be provided, and an electrochemical element in which an electric short circuit more hardly occurs, can be provided.

On the other hand, the separator for an electrochemical element according to the conventional technology as disclosed in, for example, Patent Literature 1, tends to have a larger difference between the maximum pore diameter and the average pore diameter, a larger difference between the average pore diameter and the minimum pore diameter, and a larger difference between the maximum pore diameter and the minimum pore diameter, so that the separator for an electrochemical element has a non-uniform and non-dense structure having a large distance between constituent fibers, in which pinholes are likely to exist.

Therefore, under the conventional technology, when using a thin fibrous structure having a thickness of 20 μm or less, in order to provide a thin separator for an electrochemical element having a thickness of, for example, 20 μm or less, it is difficult to provide a separator for an electrochemical element having no pinholes.

Whether a fibrous structure or a separator for an electrochemical element has pinholes can be determined by the following determination method.

(Method of Determining Presence or Absence of Pinholes)

(1) to prepare a photograph sample obtained by placing a fibrous structure alone on a film substrate, or a photograph sample obtained by placing a separator for an electrochemical element comprising a fibrous structure on a film substrate.

(2) to take a scanning electron microscope (SEM) photograph with a magnification of 500 times of the main surface of the exposed fibrous structure alone or the separator for an electrochemical element in the photographed sample, from the side of the exposed fibrous structure alone or the separator for an electrochemical element, using a scanning electron microscope (SEM).

(3) to confirm presence or absence of a part (pinholes) surrounded by the constituent fibers on the main surface in which the film substrate is exposed, by using the above SEM photograph.

The separator for an electrochemical element according to the present invention comprises the above described fibrous structure. The fibrous structure alone may be used as a separator for an electrochemical element. Or the fibrous structure separately having a member such as a reinforcing layer may be used as a separator for an electrochemical element.

Further, the separator for an electrochemical element may be punched in a shape according to the shape of the electrochemical element to be used, or processed so as to have a wound shape, or the like.

A method of producing a separator for an electrochemical element according to the present invention is explained. The descriptions of the same constitutional items as those described for the separator for an electrochemical element are omitted in the following.

A method of producing a separator for an electrochemical element may be appropriately selected. As an example, a separator for an electrochemical element, comprising a fibrous structure according to the present invention can be provided by using a method of producing a fibrous structure, comprising:

(1) a step of preparing a sheet-like fabric;
(2) a step of forming a dispersion containing short fibers and/or pulp-like fibers on one main surface of the fabric, to form a fiber deposit layer wherein the short fibers and/or the pulp-like fibers are mixed with each other, and some of the short fibers and/or the pulp-like fibers penetrates into the fabric; and
(3) a step of drying the laminate comprising the fiber deposit layer formed on one main surface of the fabric.

First explanation is (1) a step of preparing a sheet-like fabric.

A sheet-like fabric is a member capable of forming a second fibrous layer part. For example, a sheet-like fabric such as a fiber web, a nonwoven fabric, a woven fabric or a knitted fabric may be used. In particular, a sheet-like fabric is preferably a fiber web or a wetlaid nonwoven fabric formed by a wetlaid process.

Porosity of the sheet-like fabric is appropriately selected, but it is preferably 20% or more, more preferably 30% or more, and even more preferably 40% or more, so that some of the short fibers and/or the pulp-like fibers can penetrates deeply the fabric. On the other hand, when the porosity is too high, the strength decreases and cracks tend to occur in the separator for an electrochemical element. Therefore, the porosity is realistically 85% or less.

Next explanation is (2) a step of forming a dispersion containing short fibers and/or pulp-like fibers on one main surface of the fabric, to form a fiber deposit layer wherein the short fibers and/or the pulp-like fibers are mixed with each other, and some of the short fibers and/or the pulp-like fibers penetrates into the fabric.

A dispersion medium of the dispersion containing the short fibers and/or the pulp-like fibers may be appropriately selected. As the dispersion medium, a dispersion containing a dispersing agent and/or an active agent, or water containing no dispersing agent and no active agent may be used.

Then, the dispersion prepared in this manner is poured and formed on one main surface of the fabric. The dispersion medium of the dispersion may be sucked and removed by a suction device presented on the other main surface side of the fabric. Here, when the dispersion medium of the dispersion is water containing no dispersing agent and no active agent, the dispersion medium can be easily removed at the time of removal of the dispersion medium by suction, and formation of pinholes formed by the dispersion medium passing through the fibrous structure can be prevented, and a fibrous structure in which some of short fibers and/or pulp-like fibers penetrate deeply the fabric, can be preferably prepared.

Final explanation is (3) a step of drying the laminate comprising the fiber deposit layer formed on one main surface of the fabric.

This step can prepare the fibrous structure by removing the dispersion medium of the dispersion from the laminate. A drying method may be appropriately selected. It includes, for example, a drying method by removing the dispersion medium from the laminate by suction or blowing off; a drying method by removing the dispersion medium from the laminate by subjecting to a drying heater; a drying method of removing the dispersion medium from the laminate by subjecting to hot air, infrared light, or the like; a drying method by removing the dispersion medium from the laminate by allowing it to stand under a room temperature environment or a low pressure environment; a drying method by removing the dispersion medium from the laminate by absorbing the dispersion medium with a fabric having water absorbency such as felt; a drying method by removing the dispersion medium from the laminate by bringing it into contact with a heating roll (if necessary, pressing with the heating roll while bringing it into contact); and the like.

When the laminate includes an adhesive material such as a binder or an adhesive fiber, the adhesive material may be melted by subjecting it to a heater in this step to let the fibers or particles be adhered to each other.

Due to performing the above preparation steps, a fibrous structure having respective pore diameters as defined by the present invention can be prepared, wherein the first fibrous layer part derived from the fiber deposit layer formed by intertwining the short fibers and/or the pulp-like fibers on one main surface of the second fibrous layer part derived from the fabric is formed, and wherein some of the short fibers and/or the pulp-like fibers constituting the first fibrous layer part penetrates the second fibrous layer part.

A separator for an electrochemical element may be used, wherein the first fibrous layer part formed by intertwining the short fibers and/or the pulp-like fibers respectively on both main surfaces of the second fibrous layer part is formed, and wherein some of the short fibers and/or the pulp-like fibers constituting the first fibrous layer part penetrates respectively the second fibrous layer part. Such a separator for an electrochemical element may be prepared by pouring and forming the dispersion liquid prepared as described above on both main surfaces of the fabric.

The prepared fibrous structure alone may be used as a separator for an electrochemical element. Or the fibrous structure separately having a member such as a reinforcing layer may be used as a separator for an electrochemical element.

Further, the fibrous structure or the laminate including the fibrous structure may be subjected to a hydrophilic treatment step in order to give or improve retention of the electrolyte. Examples of the hydrophilic treatment step include a sulfonation treatment, a fluorine gas treatment, a graft polymerization treatment of a vinyl monomer, a surfactant treatment, a discharge treatment, a hydrophilic resin addition treatment, and the like.

Further, the fibrous structure or the laminate including the fibrous structure may be subjected to various secondary processes such as punching in a shape according to the shape of the electrochemical element to be used, processing so as to have a wound shape, to produce a separator for an electrochemical element.

EXAMPLE

Hereinafter, the present invention is explained specifically with reference to examples, but the present invention is not limited only to these examples.

Example 1

A fiber web obtained by a wetlaid process from polyethylene terephthalate short fibers (fiber length: 3 mm, fineness: 0.2 d) was subjected to a heating roll whose surface temperature was adjusted to 180° C., and was heated and pressed, to let polyethylene terephthalate short fibers be crystallized, and to adhere respective polyethylene terephthalate short fibers with polyethylene terephthalate short fibers without melting, and the wetlaid nonwoven fabric A (thickness: 10 basis weight: 6 g/m$^2$, porosity: 56%, fiber length of constituent fibers: 3 mm, fineness of component fibers: 0.2 d) was prepared.

Then, polyethylene terephthalate short fibers (fiber length: 3 mm, fineness: 0.2 d) and pulp-like fibers of an aramid resin (freeness: 50 ml CSF) were dispersed in water having no dispersing agent and no active agent at the ratio of polyethylene terephthalate short fibers:pulp-like fibers of an aramid resin=20% by mass:80% by mass to prepare the dispersion A.

Subsequently, the dispersion A was formed on one main surface of the wet nonwoven fabric A, and then, the dispersion medium was suctioned and removed from the side of the wet nonwoven fabric A, whereby a fiber deposit layer was formed in which polyethylene terephthalate short fibers and pulp-like fibers of an aramid resin was mixed on the one main surface of the wet nonwoven fabric A.

Next, the laminate web prepared as described above was subjected to a heat treatment by exposing it under an atmosphere at a temperature of 145° C. while being supported by a conveyor, and the dispersion medium was removed and dried from the laminate web. Then, the laminate web was heated and pressed using a heating roll whose surface temperature was adjusted to 180° C. to let polyethylene terephthalate short fibers be crystallized, and to adhere respective polyethylene terephthalate short fibers and polyethylene terephthalate short fibers and pulp-like fibers of an aramid resin with polyethylene terephthalate short fibers without melting, and a separator for an electrochemical element was prepared.

Comparative Example 1

The dispersion B was prepared by adding a viscosity agent and an active agent to the dispersion A at the ratio of 0.7% by mass of the viscosity agent and 0.01% by mass of the active agent in relation to 100% by mass of the fibers dispersed in the dispersion A.

A separator for an electrochemical element was prepared in the same manner as in Example 1 except for using the dispersion B instead of the dispersion A.

Example 2

A separator for an electrochemical element was prepared in the same manner as in Example 1 except for increasing the amount of the dispersion A to be formed on one main surface of the wet nonwoven fabric A.

Example 3

A fiber web obtained by a wetlaid process from polyethylene terephthalate short fibers (fiber length: 3 mm, fineness: 0.2 d) was subjected to a heating roll whose surface temperature was adjusted to 180° C., and was heated and pressed, to let polyethylene terephthalate short fibers be crystallized, and to adhere respective polyethylene terephthalate short fibers with polyethylene terephthalate short fibers without melting, and the wetlaid nonwoven fabric B (thickness: 8 μm, basis weight: 4.5 g/m$^2$, porosity: 59%, fiber length of constituent fibers: 3 mm, fineness of component fibers: 0.2 d) was prepared.

A separator for an electrochemical element was prepared in the same manner as in Example 1 except for using the wetlaid nonwoven fabric B in place of the wetlaid nonwoven fabric A.

Example 4

A fiber web obtained by a wetlaid process from polyethylene terephthalate short fibers (fiber length: 3 mm, fineness: 0.2 d) was subjected to a heating roll whose surface temperature was adjusted to 180° C., and was heated and pressed, to let polyethylene terephthalate short fibers be crystallized, and to adhere respective polyethylene terephthalate short fibers with polyethylene terephthalate short fibers without melting, and the wetlaid nonwoven fabric C (thickness: 8 μm, basis weight: 4 g/m$^2$, porosity: 64%, fiber length of constituent fibers: 3 mm, fineness of component fibers: 0.2 d) was prepared.

A separator for an electrochemical element was prepared in the same manner as in Example 1 except for using the wetlaid nonwoven fabric C instead of the wetlaid nonwoven fabric A.

Example 5

50% by mass of polyethylene terephthalate short fibers (fiber length: 3 mm, fineness: 0.2 d), 30% by mass of another polyethylene terephthalate short fibers (fiber length: 3 mm, fineness: 0.06 d) and 20% by mass of pulp-like fibers of an aramid resin (freeness: 50 ml CSF) were mixed. A fiber web obtained by a wetlaid process from the obtained mixture was subjected to a heating roll whose surface temperature was adjusted to 180° C., and heated and pressed, to let polyethylene terephthalate short fibers be crystallized, and to adhere respective polyethylene terephthalate short fibers and pulp-like fibers of an aramid resin and polyethylene terephthalate short fibers with polyethylene terephthalate short fibers without melting, and the wetlaid nonwoven fabric D (thickness: 11 μm, basis weight: 5 g/m$^2$, porosity: 67%) was prepared.

A separator for an electrochemical element was prepared in the same manner as in Example 1 except for using the wetlaid nonwoven fabric D instead of the wetlaid nonwoven fabric A.

As a result of subjecting the separators for an electrochemical element prepared in Examples and Comparative Example to the above mentioned "Method of determining presence or absence of pinholes", the followings were found. When preparing a photograph sample, the main surface derived from the fiber deposit layer of the separator for an electrochemical element (the main surface on the side of the first fibrous layer part) was made to face the film substrate. Therefore, the main surfaces derived from the wetlaid nonwoven fabrics A to D of the separators for an electrochemical element (the main surface on the side of the second fibrous layer part) were taken in the SEM photographs.

No pinholes were present in any of the SEM photographs of the separators for an electrochemical element of Examples, whereas presence of pinholes were recognized in the SEM photographs of the separators for an electrochemical element of Comparative Examples.

Figure 2:
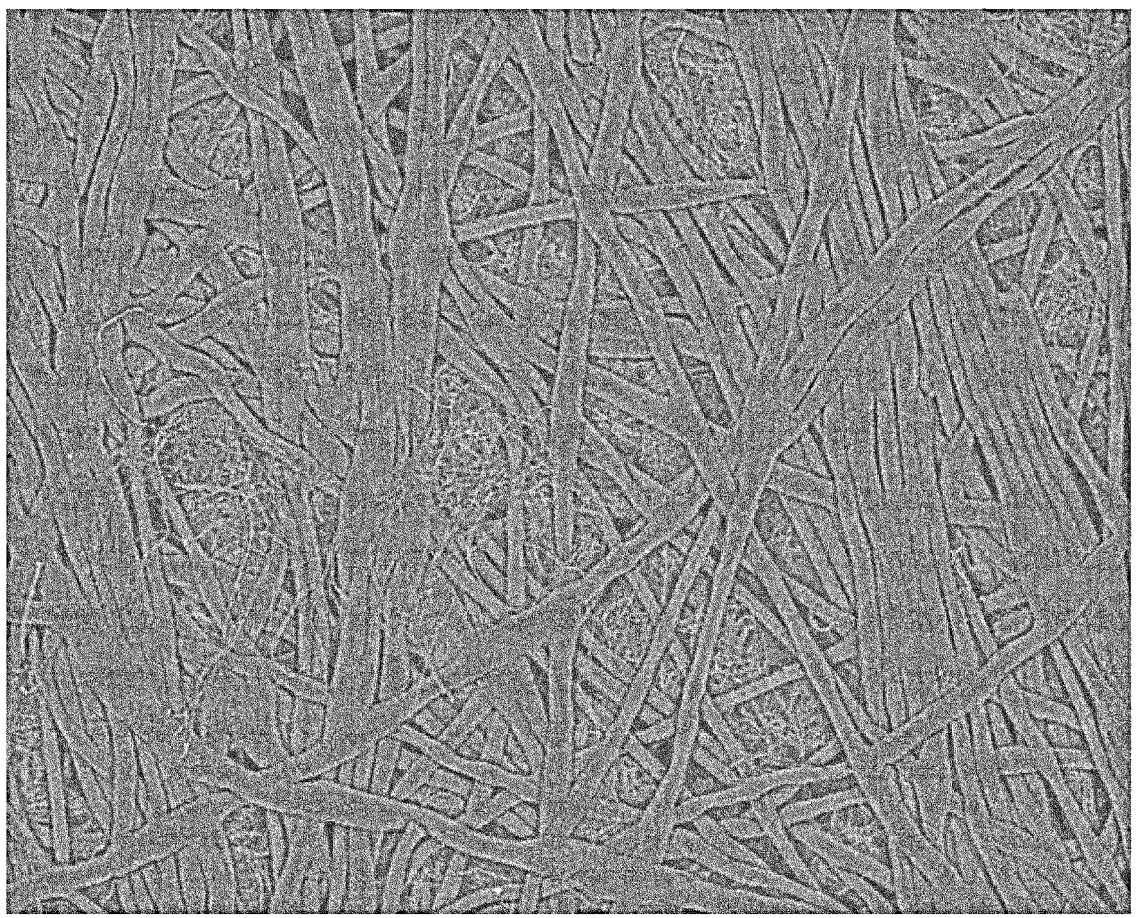
FIG. 2 is a scanning electron microscope photograph with a magnification of 500 times of a portion different from the portion taken in FIG. 1 of the main surface of the exposed second fibrous layer part in the separator for an electrochemical element prepared in Example 1.
Figure 3:
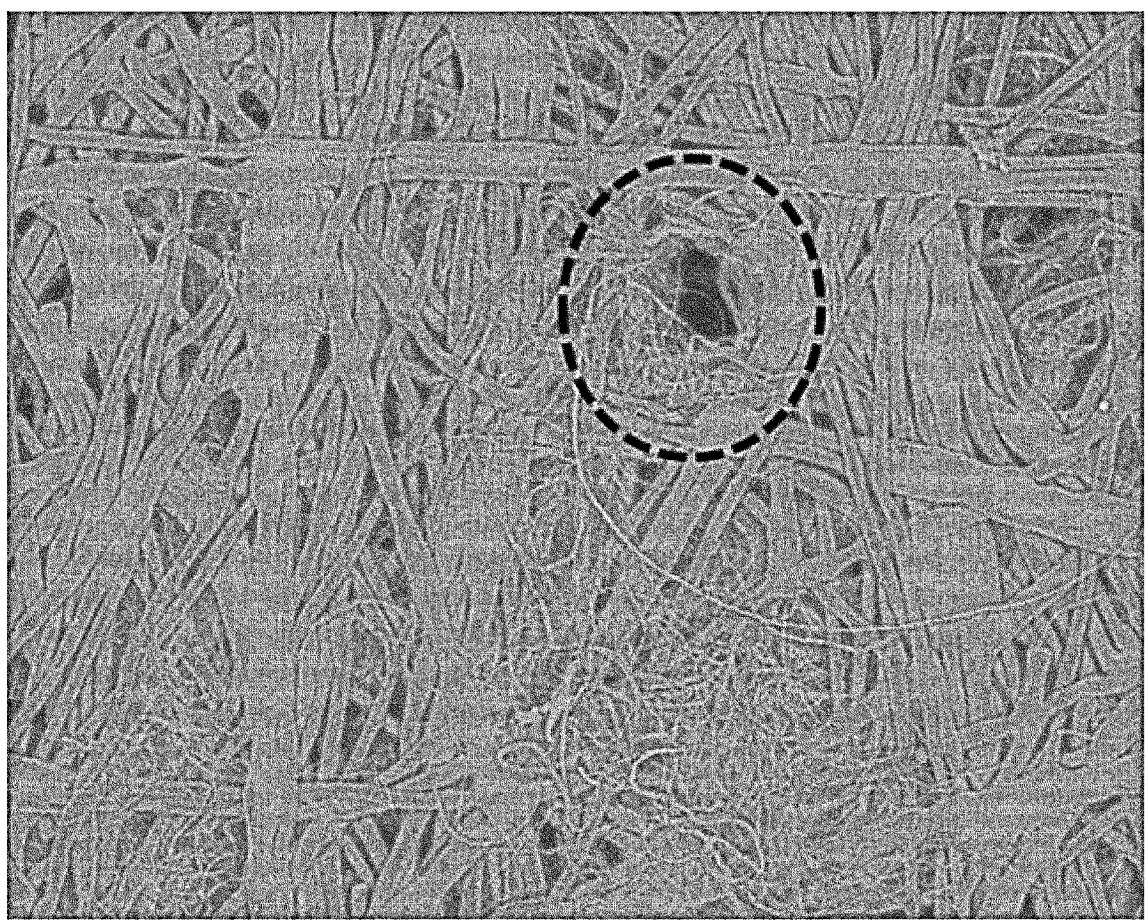
FIG. 3 is a scanning electron microscope photograph with a magnification of 500 times of the main surface of the exposed second fibrous layer part in the separator for an electrochemical element prepared in Comparative Example 1.
Figure 4:
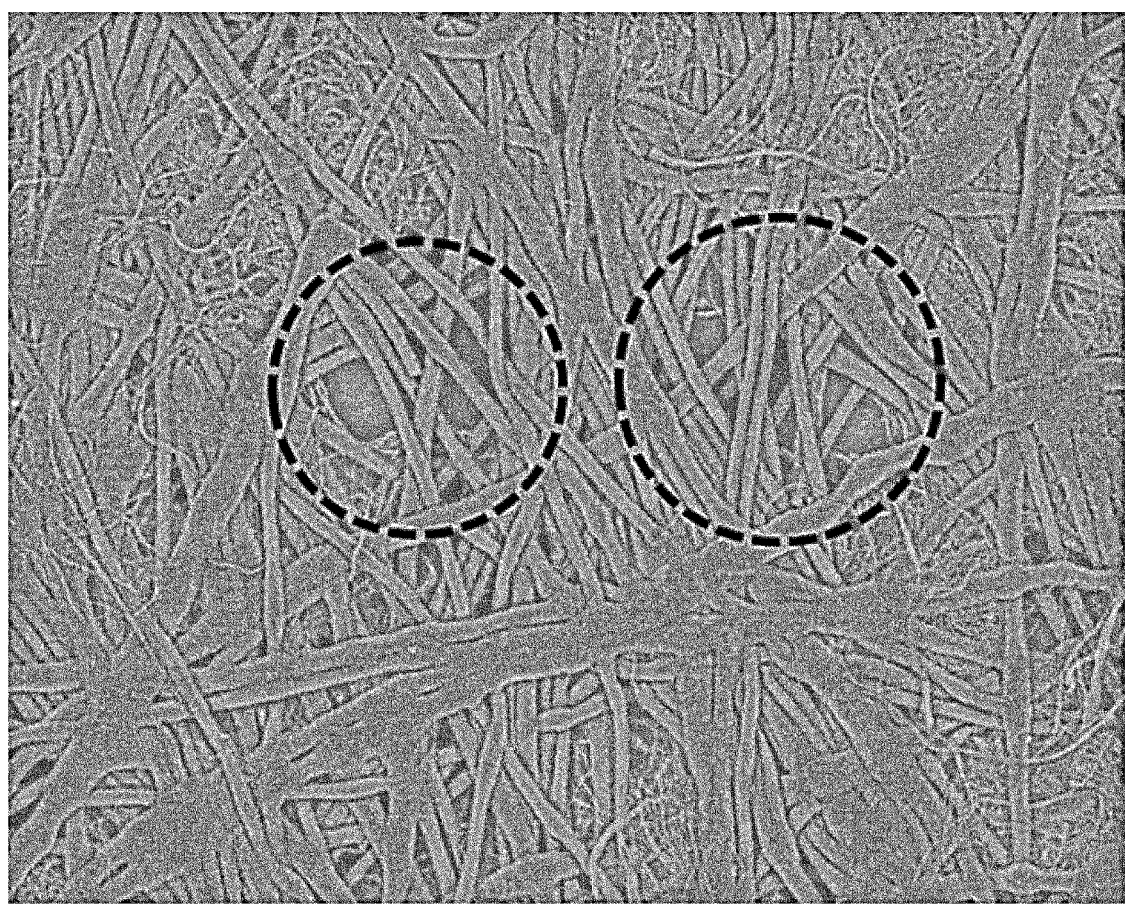
FIG. 4 is a scanning electron microscope photograph with a magnification of 500 times of a portion different from the portion taken in FIG. 3 of the main surface of the exposed second fibrous layer part in the separator for an electrochemical element prepared in Comparative Example 1.

Two SEM photographs of mutually different portions of the separator for an electrochemical element of Example 1 when the separator for an electrochemical element were subjected to "Method of determining presence or absence of pinholes" and were photographed, are shown in FIG. 1 and FIG. 2. Two SEM photographs of mutually different portions of the separator for an electrochemical element of Comparative Example 1 when the separator for an electrochemical element were subjected to "Method of determining presence or absence of pinholes" and were photographed, are shown in FIG. 3 and FIG. 4. Pinholes do not exist in the SEM photographs of Example 1, whereas pinholes exist in the SEM photographs of Comparative Example 1 (see a part surrounded by a broken line in FIG. 3, two parts surrounded by a broken line in FIG. 4).

Some of the short fibers and/or the pulp-like fibers constituting the first fibrous layer part derived from the fiber deposit layer penetrates deeply into the second fibrous layer part until being exposed on the main surface where the second fibrous layer part derived from the wetlaid nonwoven fabrics A to D is exposed.

Various physical properties of the separators for an electrochemical element of Examples and Comparative Examples were measured, and are summarized in Table 1.

TABLE 1

|  | Example 1 | Comparative Example 1 | Example 2 | Example 3 | Example 4 | Example 5 |
|---|---|---|---|---|---|---|
| Basis Weight (g/m$^2$) | 9 | 9 | 11 | 7 | 7 | 8 |
| Thickness (μm) | 11 | 13 | 19 | 10 | 10 | 12 |

TABLE 1-continued

|  | Example 1 | Comparative Example 1 | Example 2 | Example 3 | Example 4 | Example 5 |
|---|---|---|---|---|---|---|
| Air Permeability (cm³/cm²/sec) | 2 | 4 | 3 | 3 | 3 | 2 |
| Porosity (%) | 44 | 48 | 60 | 52 | 48 | 51 |
| Mass Average Density (g/cm³) | 0.79 | 0.71 | 0.58 | 0.65 | 0.68 | 0.68 |
| Dmax: Maximum Pore Diameter (μm) | 5 | 18 | 5 | 7 | 11 | 3 |
| Dave: Average Pore Diameter (μm) | 3 | 5 | 3 | 3 | 4 | 2 |
| Dmax − Dave | 2 | 13 | 2 | 4 | 7 | 1 |
| Minimum Pore Diameter (μm) | 2 | 3 | 2 | 3 | 3 | 1 |
| Presence of Pinholes | No | Yes | No | No | No | No |

The separators for an electrochemical element of Examples 1 to 5 satisfied the pore diameter distribution defined by the present invention and had no pinhole. On the other hand, the separator for an electrochemical element of Comparative Example 1 did not satisfy the pore diameter distribution defined by the present invention, and the separator for an electrochemical element of Comparative Example 1 had pinholes.

As described above, the present invention can provide a separator for an electrochemical element capable of providing an electrochemical element in which an electric short circuit hardly occurs, and higher electric resistance between electrodes than intended is prevented.

Further, the present invention can provide a separator for an electrochemical element capable of providing an electrochemical element in which an electric short circuit more hardly occurs, because a thin separator for an electrochemical element having a thickness of, for example, 20 μm or less can be provided in a form without pinholes.

Example 6

Silica particles and cellulose nanofibers were added to pure water and mixed using a Disper type stirring blade. After mixing, a polyacrylic acid resin binder was added thereto and continued to be stirred to prepare a coating liquid (liquid temperature: 25° C., concentration of solid contents: 27% by mass).

Composition and mass of the solid contents in the coating liquid were as described below:
Silica particle ($D_{50}$: 450 nm): 98 parts by mass
Cellulose nanofiber: 0.01 parts by mass
Polyacrylic acid resin binder: 2 parts by mass.

The coating liquid was applied to the main surface on the side of the fibrous layer derived from the wetlaid nonwoven fabric A in the separator for an electrochemical element prepared in Example 2 using a gravure roll. Then, the wetlaid nonwoven fabric A containing the coating liquid was dried at 100° C. to remove the dispersion medium in the coating liquid to prepare a separator for an electrochemical element.

Example 7

A separator for an electrochemical element was prepared in the same manner as in Example 6 except for changing application amount of the coating liquid.

Example 8

Silica particles were added to pure water and mixed using a Disper type stirring blade. After mixing, a polyacrylic acid resin binder was added thereto and continued to be stirred to prepare a coating liquid (liquid temperature: 25° C., concentration of solid contents: 27% by mass).

Composition and mass of the solid contents in the coating liquid were as described below.
Silica particles ($D_{50}$: 2.1 μm): 98 parts by mass
Polyacrylic acid resin binder: 2 parts by mass The coating liquid was applied to the main surface on the side of the fibrous layer derived from the wetlaid nonwoven fabric A in the separator for an electrochemical element prepared in Example 2 using a gravure roll. Then, the wetlaid nonwoven fabric A containing the coating liquid was dried at 100° C. to remove the dispersion medium in the coating liquid to prepare a separator for an electrochemical element.

Various physical properties of the separators for an electrochemical element having particles supported on their surfaces of Examples prepared as described above were measured, and are summarized in Table 2.

TABLE 2

|  | Example 6 | Example 7 | Example 8 |
|---|---|---|---|
| Basis Weight (g/m²) | 17 | 14 | 26 |
| Thickness (μm) | 21 | 20 | 29 |
| Air Permeability (cm³/cm²/sec) | 0.05 | 0.17 | 0.27 |
| Porosity (%) | 50 | 52 | 57 |
| Mass Average Density (g/cm³) | 0.81 | 0.70 | 0.90 |
| Dmax: Maximum Pore Diameter (μm) | 1.0 | 2.6 | 1.1 |
| Dave: Average Pore Diameter (μm) | 0.5 | 1.5 | 0.9 |
| Dmax − Dave | 0.5 | 1.1 | 0.2 |
| Minimum Pore Diameter (μm) | 0.4 | 1.2 | 0.7 |
| Presence of Pinholes | No | No | No |

From the results of Examples 6 to 8, the separators for an electrochemical element, loading the particles on the surface thereof according to the present invention, have a further smaller maximum pore diameter and a further smaller minimum pore diameter, and a further narrower pore diameter distribution.

Therefore, the separator for an electrochemical element according to the present configuration can provide an electrochemical element in which thermal stability is improved and reduction of battery capacity is improved, and an electric short circuit hardly occurs and the electric resistance between the electrodes is prevented from being higher than intended.

INDUSTRIAL APPLICABILITY

The separator for an electrochemical element according to the present invention may be used, for example, as a separator for an electrochemical element which separates electrodes from each other, for an electrochemical element such as a primary battery (for example, a lithium battery, a manganese battery, a magnesium battery, etc.) and a secondary battery (for example, a lithium ion battery, a nickel-metal hydride battery, a nickel cadmium battery, a zinc battery, a redox flow battery, etc.), a capacitor, a fuel cell battery and the like, irrespective of an aqueous system or a non-aqueous system.

The invention claimed is:

1. A method for preparing a separator for an electrochemical element, comprising the following steps:
   (1) a step of preparing a nonwoven fabric containing second short fibers as the constituent fibers wherein fibers in the nonwoven fabric are adhered to each other by the second short fibers without using a binder;
   (2) a step of forming a dispersion containing first short fibers and pulp-like fibers in a dispersion medium on one main surface of the nonwoven fabric, and sucking and removing the dispersion medium from the other main surface side of the nonwoven fabric, to form a fiber deposit layer on the one main surface of the nonwoven fabric, wherein the first short fibers and the pulp-like fibers are mixed with each other, and some of the first short fibers and the pulp-like fibers penetrates into the nonwoven fabric; and
   (3) a step of drying a laminate comprising the fiber deposit layer formed on the one main surface of the nonwoven fabric,
   wherein:
      the separator for an electrochemical element comprises a fibrous structure;
      the fibrous structure has a first fibrous layer part in which the first short fibers and pulp-like fibers are intertwined with each other, and a second fibrous layer part derived from the nonwoven fabric in which the fibrous structure comprises the second short fibers;
      the first short fibers comprised in the first fibrous layer part are fibers comprising at least one resin selected from the group consisting of polyester resins, polyolefin resins and nylon resins;
      the first short fibers comprised in the first fibrous layer part adhere the first short fibers and/or the pulp-like fibers composing the first fibrous layer part to each other by heating;
      the second short fibers comprised in the second fibrous layer part adhere the constituent fibers composing the second fibrous layer part to each other without melting of the second short fibers by pressing in addition to heating;
      some of the first short fibers and the pulp-like fibers constituting the first fibrous layer part penetrates the second fibrous layer part; and
      a pore diameter distribution of the fibrous structure satisfies the following formula:

$0 \ \mu m < D\max < 18 \ \mu m$, and $0 \ \mu m \leq (D\max - D\mathrm{ave}) < 13 \ \mu m$, wherein Dmax is a maximum pore diameter (μm) of the fibrous structure, and Dave is an average pore diameter (μm) of the fibrous structure.

2. The method according to claim 1, wherein a percentage by mass of the pulp-like fibers in relation to the constituent fibers of the first fibrous layer part is 10% by mass or more.

3. The method according to claim 1, wherein the pulp-like fibers are pulp-like fibers of an aramid resin.

4. The method according to claim 1, wherein the fibrous structure comprises particles.

5. A separator for an electrochemical element which is prepared by the method according to claim 1.

* * * * *